United States Patent [19]

Naft

[11] Patent Number: 5,097,753
[45] Date of Patent: Mar. 24, 1992

[54] STEAM COOKING UTENSIL

[75] Inventor: Stuart Naft, Stratford, Conn.

[73] Assignee: Black & Decker Inc., Newark, Del.

[21] Appl. No.: 712,816

[22] Filed: Jun. 10, 1991

[51] Int. Cl.[5] ............................................. A47J 27/04
[52] U.S. Cl. ...................................... 99/341; 99/415;
99/417; 99/446; 99/450; 126/369; 219/401
[58] Field of Search ................. 99/339, 341, 345, 346,
99/410–418, 450, 448, 467, 473, 483, DIG. 15;
126/369; 219/401; 426/510

[56] References Cited

U.S. PATENT DOCUMENTS

| | | | |
|---|---|---|---|
| 222,296 | 12/1879 | McMurray | 126/369 |
| 1,228,816 | 6/1917 | Peterson et al. | 99/450 |
| 1,651,442 | 12/1927 | Caskin | 126/369 |
| 2,145,263 | 1/1939 | Huntzinger et al. | 126/369 |
| 2,622,591 | 12/1952 | Bramberry | 126/369 |
| 3,314,358 | 4/1967 | Burns | 99/415 |
| 4,509,412 | 4/1985 | Whittenburg et al. | 99/413 |
| 4,676,151 | 6/1987 | Gorsuch et al. | 99/450 |
| 4,702,160 | 10/1987 | Manganese | 99/417 |
| 4,739,698 | 4/1988 | Allaire | 99/410 |
| 4,920,251 | 4/1990 | Whitenack et al. | 219/401 |

FOREIGN PATENT DOCUMENTS

| | | | |
|---|---|---|---|
| 229565 | 2/1925 | United Kingdom | 99/417 |

*Primary Examiner*—Timothy F. Simone
*Attorney, Agent, or Firm*—Barry E. Deutsch

[57] ABSTRACT

A steam cooking utensil includes a base, a boiling liquid reservoir defined by the base, and a heater mounted in the base to heat liquid in the boiling liquid reservoir. A drip ring is supported in the base above the liquid reservoir. A cooking bowl is supported by the base and includes a bottom tray having an imperforate surface and a food support surface extending radially outwardly from the imperforate surface. The food support surface is defined by a plurality of alternating hill-like ridges and valley-like channels extending radially outwardly in concentrically spaced rings. The food support surface includes a plurality of vent holes for enabling steam generating in the reservoir to flow into the cooking bowl.

8 Claims, 2 Drawing Sheets

STEAM COOKING UTENSIL

BACKGROUND OF THE INVENTION

This invention relates to steam cooking utensils and in particular to such utensils wherein the flow of steam into the cooking bowl is controlled to provide even cooking for various types and sizes of food and the flow of food drippings from the bowl is controlled so that the drippings are collected in a drip tray.

The use of steam cooking utensils has grown in popularity in recent years due to the general health consciousness of the population. Foods cooked in steamers tend to maintain their nutrients. However, many commonly used and popular steam cooking utensils suffer from significant functional problems.

For example, some steam cooking utensils allow food juices or food drippings to return to the boiling water reservoir whereat the juices or drippings will be boiled again which emits foul odors and results in cleaning problems.

Steam cooking utensils which have attempted to solve the dripping problem have created other problems. For example, in one utensil design some of the steam vent holes used to provide steam to a cooking chamber have been blocked which results in uneven cooking of the food. Still other utensils have divided the boiling water reservoir into two parts, fresh and "dirty" portions. This results in the drippings being separated from the fresh water used to generate steam; however this system also produces unevenly cooked food due to poor steam circulation.

It is accordingly an object of this invention to provide a steam cooking utensil whereby the steam path is controlled to provide even cooking of the food and the flow of food drippings is also controlled to direct the drippings into a drip collection tray.

SUMMARY OF THE INVENTION

The foregoing object and other objects of the invention are attained in a steam cooking utensil comprising a base; a boiling liquid reservoir defined by the base; a heater mounted in the base to heat liquid in the boiling liquid reservoir; a drip ring supported in said base above said liquid reservoir and including an imperforate surface and an opening axially aligned with said heater; a cooking bowl supported by said base and including a bottom tray having an imperforate surface axially aligned with the openings in the drip ring and the heater, and a food support surface extending radially outwardly from said imperforate surface, said food support surface being defined by a plurality of alternating hill-like ridges and valley-like channels extending radially outwardly in concentrically spaced rings, said food support surface including a plurality of vent holes for enabling steam generated in said reservoir to flow into said cooking bowl; and a lid for closing the open end of said cooking bowl.

DESCRIPTION OF THE PREFERRED EMBODIMENT

Figure 1:
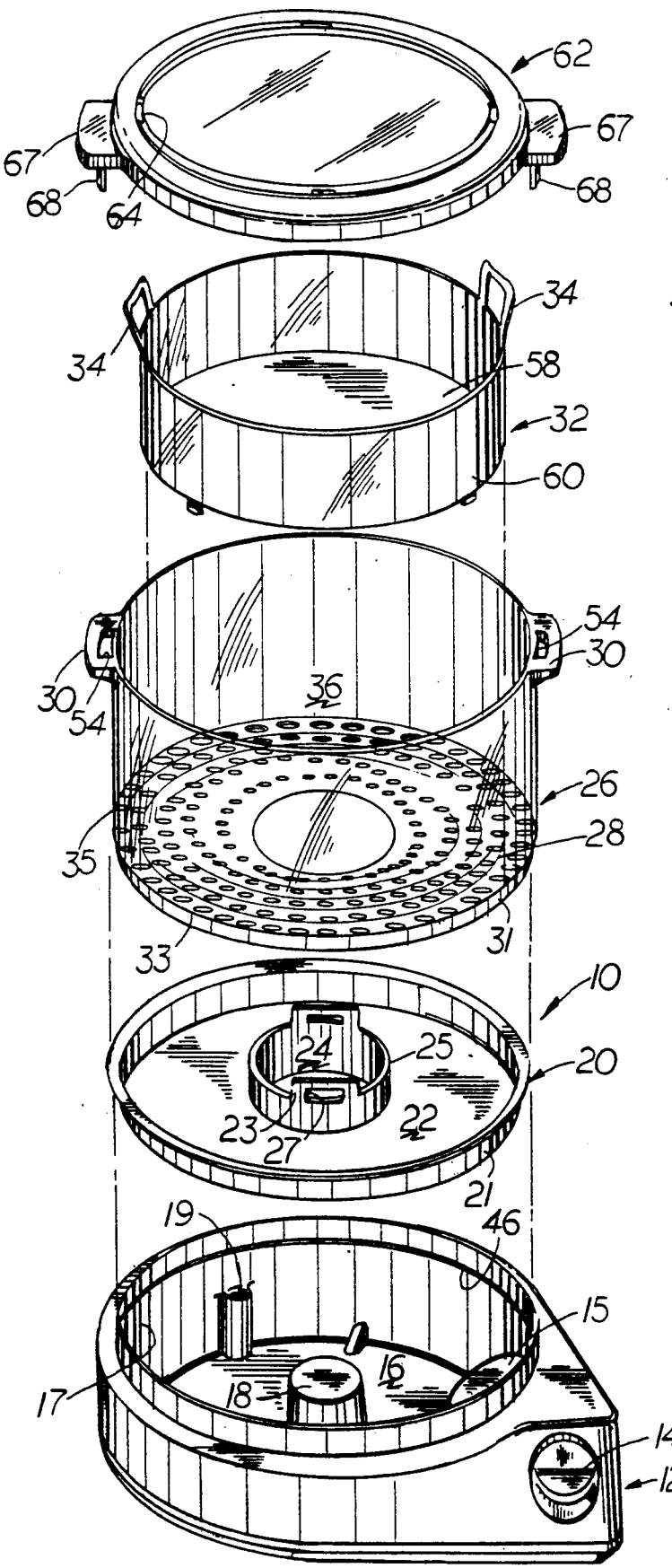
FIG. 1 is an exploded perspective view of a steam cooking utensil in accordance with the present invention.

Referring now to the various figures of the drawing, a preferred embodiment of the present invention shall be described in detail. In referring to the several figures of the drawing, like numerals shall refer to like parts.

The present invention is embodied in a steam cooking utensil generally referenced by the numeral 10. Utensil 10 includes a base member 12 having wall 17 defining a boiling liquid reservoir 16. A heating element 18 is mounted in reservoir 16 to provide heat to the liquid, such as water to transform the water into steam. Preferably, heating element 18 is centrally mounted within reservoir 16. Base 12 may also include an "on/off" switch 14 for selectively connecting the utensil to a source of electrical power. Switch 14 may include a timer so that electrical power is only delivered to utensil 10 for a predetermined period of time. A thermostat (not shown) may also be associated with switch 14 to turn the switch off in the event liquid has been evaporated from reservoir 16 and utensil 10 is still connected to the source of electrical power. Wall 17 includes an annular flange-like surface 46 and also includes a pair of annularly spaced support feet 19 and a support pad 15.

Utensil 10 further includes a ring-like member 20 supported by base 12. Member 20 includes an annular outer wall 21 concentrically positioned about and spaced from an annular inner wall 25. Wall 25 defines an opening 24 which is axially aligned with heater element 18. The bottom of ring-like member 20 is defined by an imperforate 22. Wall 25 includes a pair of annularly spaced upstanding ears 23, each having a slot 27. Ears 23 are used by the user of utensil 10 to lift member 20 relative to housing 12. Member 20 is supported on pad 15 and feet 19 of base 12.

Utensil 10 also includes a cooking bowl 26 which is also supported by base 12. Bowl 26 includes an axially extending outer wall 35 which defines a food cooking space 36. The lower end of bowl 26 is closed by food support tray 28. The specific details of the construction of tray 28 shall be more fully described hereinafter. Bowl 26 includes a pair of radially outwardly extending ears 30; each ear includes a slot 54. Bowl 26 further includes an axially extending wall 31 which is radially offset inwardly relative to wall 35 to define a horizontally extending flange-like surface 33. Surface 33 is supported on the top surface of wall 17 of base 12.

Utensil 10 may include a second somewhat smaller cooking bowl 32 which, when used, is nested within bowl 26. Bowl 32 is used for cooking such food as rice or the like. Bowl 32 includes an outer wall 60 and a bottom imperforate wall 58. Bowl 32 further includes a pair of spaced upwardly extending ears 34 which may be grasped by the user for raising bowl 32 upwardly relative to bowl 26.

Utensil 10 also comprises a lid 62. Lid 62 includes a plurality of openings 64 formed in top surface 66 thereof. Openings 64 function as steam vents. Lid 62 further includes a pair of radially extending ears 67, each ear having an axially extending finger 68. Fingers 68 conform to the configuration of slots 54 of bowl 26 to join lid 62 snugly to the bowl. Each opening is defined by axially extending wall means 70. The function of wall means 70 shall be more fully explained hereinafter.

Figure 2:
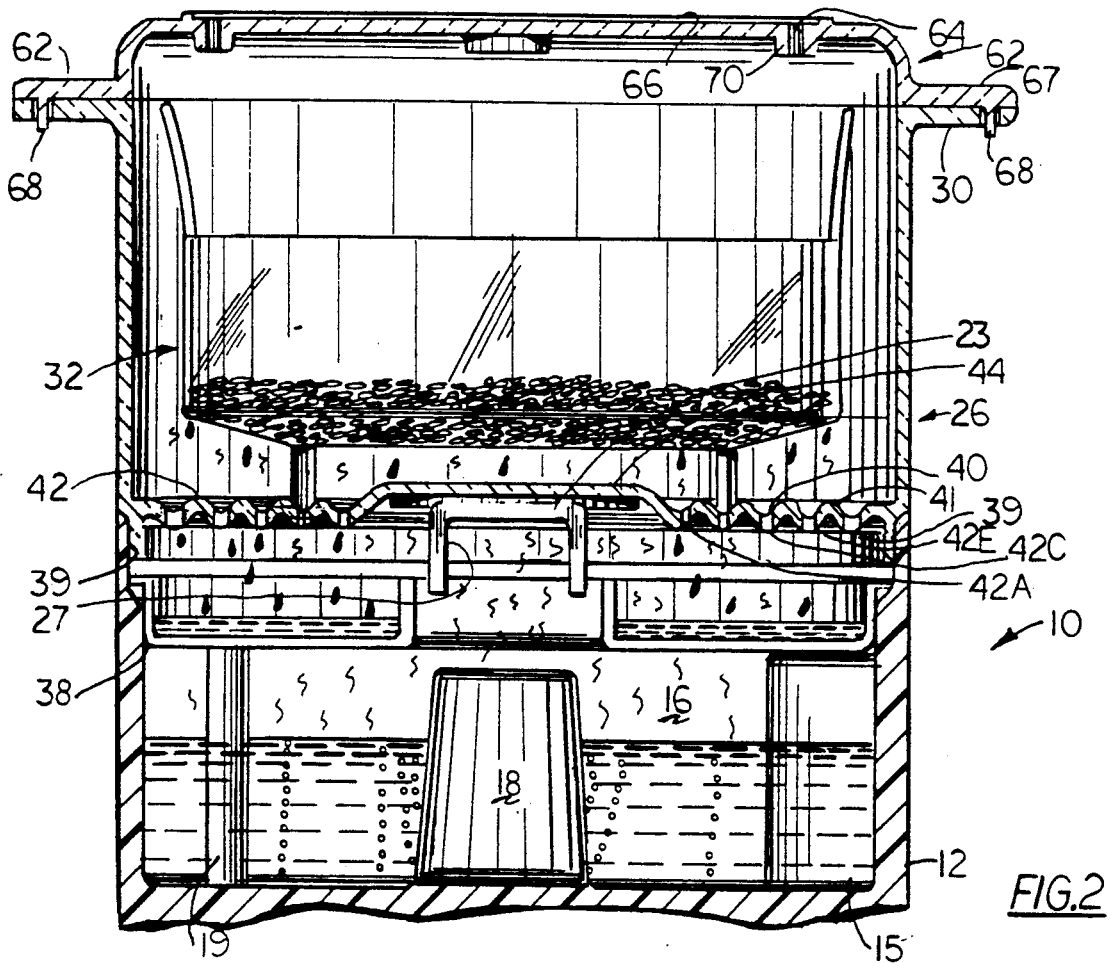
FIG. 2 is an enlarged elevational sectional view showing details of the present invention.
Figure 3:
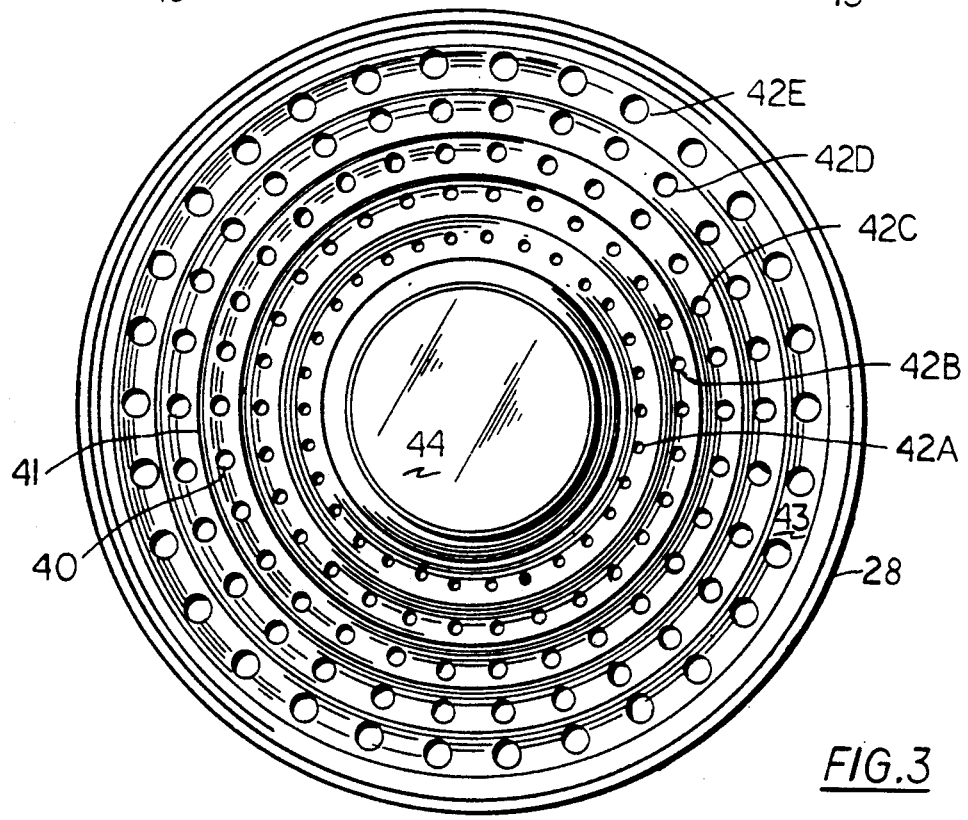
FIG. 3 is a plan view taken substantially along the line III—III of FIG. 2.

Referring specifically to FIGS. 2 and 3, the detailed features of bottom support tray 28 of bowl 26 shall now be more fully described. Tray 28 includes an imperforate surface 44 axially aligned with opening 24 in member 20 and with heater 18 mounted in base 12. A perforated food support surface 43 extends radially outwardly from imperforate surface 44. Food support surface 43 is defined by a plurality of alternating hill-like ridges 41 and valley-like channels 40 extending radially outwardly in concentrically spaced rings. Surface 43 also includes a plurality of flow openings or holes 43A through 42E for enabling steam generated in the reservoir to flow into cooking space 36. Preferably, as illustrated in FIG. 3, the diameter of the flow holes in one concentric ring increase in a radially outwardly direction relative to imperforate surface 44. Thus, flow holes 42A have the smallest diameter and flow holes 42E have the largest. Since, in the preferred embodiment, heater 18 is centrally located in reservoir 16, the flow of steam will be greatest near the center of tray 28 and will diminish towards the outer edge of the tray. By increasing the size of the flow openings formed at the outer edge of the tray as compared to the size of the openings formed towards the center of the tray, the flow of steam through all of the flow holes into cooking space 36 tends to be generally uniform.

Flow holes 42A through 42E are formed in valley-like channels 40. Hill-like ridges 41 are in contact with the food supported on support surface 43, thereby maintaining the food in spaced relation above the flow holes. This arrangement prevents the food from becoming an unintended and undesirable blockage of steam flow through the holes.

As viewed in FIG. 2, the hill-like ridges 41 formed on food support surface 43 define valley-like channels 38 on the under-surface of tray 28 and similarly, valley-like channels 40 define hill-like ridges 39 on the tray's under-surface. Drippings or juices formed in cooking space 36 flow by gravity to the lowest points on surface 43, i.e. channels 40. On the under-surface channels 40 become ridges 39 and the ridges direct the drippings directly onto plate 22 of member 20 which functions as a drip retaining tray. Wall 25 of member 20 prevents the drippings from entering opening 24.

As noted previously, lid 62 has openings 64 which serve as steam vents. Lid 62 may be used as a trivet-like support for bowl 26 on a counter or table. When used as a trivet-like support, lid 62 is inverted so that the top surface 66 thereof rests on the counter or table and the bottom surface of the bowl is nested within the annulus defined by wall 72 of the lid. Wall meanss 70 which define openings 64 function as a barrier to prevent any condensate from flowing through openings 64 onto the underlying counter or table.

In operation, fluid such as water is placed into reservoir 16 and food is placed into bowl 26 onto surface 43. The various components of utensil 10 are assembled and electrical power is delivered to heating element 18 to boil the water in the reservoir. The steam formed as a consequence of boiling the water passes upwardly through opening 24 in member 20 and thence through flow holes 42A-42E in food support tray 28. Steam is vented from bowl 26 via openings 64.

Any drippings or juices formed as a result of steaming the food held in bowl 26, flow through openings 42A-42E and are directed by ridges 39 onto member 20. The drippings are thus prevented from returning to reservoir 16.

While a preferred embodiment of the invention has been described and illustrated, the invention should not be limited thereto, but may be otherwise embodied within the scope of the following claims.

I claim:

1. A steam cooking utensil comprising:
   a base;
   a boiling liquid reservoir defined by the base;
   a heater mounted in the base to heat liquid contained in the boiling liquid reservoir;
   a drip ring supported in said base above said liquid reservoir and including an imperforate surface and an opening axially aligned with said heater;
   a drip ring supported in said base above said liquid reservoir and including an imperforate surface and an opening axially aligned with said heater;
   a cooking bowl supported by said base and including a bottom tray having an imperforate surface axially aligned with the opening in the drip ring and the heater and a food support surface extending radially outwardly from said imperforate surface, said food support surface being defined by a plurality of alternating hill-like ridges and valley-like channels extending radially outwardly in concentrically spaced rings, said food support surface including a plurality of vent holes for enabling steam generated in said reservoir to flow into said cooking bowl, said bent holes formed in the valley-like channels and the hill-like ridges maintain food supported by said bottom tray in spaced relation to said vent holes; and
   a lid for closing the open end of said cooking bowl.

2. A steam cooking utensil in accordance with claim 1 wherein the diameter of the vent holes increase as the vent holes are positioned in the food support surface radially outwardly relative to the imperforate surface.

3. A steam cooking utensil in accordance with claim 2 wherein the hill-like ridges formed on the food support surface of said bottom tray define valley-like channels on the under-surface of said tray and said valley-like channels formed on the food support surface of said tray define hill-like ridges on the under-surface thereof.

4. A steam cooking utensil in accordance with claim 1 wherein the top surface of the lid includes a plurality of steam escape openings, each opening being defined by wall means extending axially inwardly towards the base.

5. A steam cooking utensil in accordance with claim 1 wherein the hill-like ridges formed on the food support surface of said bottom tray define valley-like channels on the under surface of said tray and said valley-like channels formed on the food support surface of said tray define hill-like ridges on the under-surface thereof.

6. A steam cooking utensil comprising:
   a base;
   a boiling liquid reservoir defined by the base;
   a heater mounted in the radial center of the base to heat liquid in the boiling liquid reservoir;
   a drip ring supported in said base axially above said liquid reservoir and including a centrally located opening aligned with said heater and an imperforate surface extending radially outwardly from said opening;
   a cooking bowl including a bottom tray having an imperforate surface axially aligned with the opening in the drip ring and the heater and a perforated surface extending radially outwardly from said imperforate surface for supporting food to be steamed, the diameter of the openings in said perforated surface increasing as the openings are positioned radially outwardly relative to the imperforate surface;

means for maintaining food supported on said perforated surface spaced above said openings therethrough; and a lid for closing the open end of said cooking bowl.

7. A steam cooking utensil in accordance with claim 6 wherein the perforated surface is defined by a plurality of alternating hill-like ridges and valley-like channels extending radially outwardly in concentrically spaced rings.

8. A steam cooking utensil in accordance with claim 7 wherein the hill-like ridges maintain food supported on said perforated surface in spaced relation to said openings.

* * * * *

UNITED STATES PATENT AND TRADEMARK OFFICE
CERTIFICATE OF CORRECTION

PATENT NO. : 5,097,753

DATED : March 24, 1992

INVENTOR(S) : Stuart Naft

It is certified that error appears in the above-identified patent and that said Letters Patent is hereby corrected as shown below:

Column 4, line 26, "second word bent" should be --vent --.

Signed and Sealed this

Sixteenth Day of November, 1993

BRUCE LEHMAN

Attest:

Attesting Officer

Commissioner of Patents and Trademarks

REEXAMINATION CERTIFICATE (3159th)

United States Patent [19]
Naft

[11] B1 5,097,753
[45] Certificate Issued Mar. 18, 1997

[54] STEAM COOKING UTENSIL

[75] Inventor: Stuart Naft, Stratford, Conn.

[73] Assignee: Black & Decker, Inc., Newark, Del.

Reexamination Request:
No. 90/004,159, Mar. 1, 1996

Reexamination Certificate for:
| | |
|---|---|
| Patent No.: | 5,097,753 |
| Issued: | Mar. 24, 1992 |
| Appl. No.: | 712,816 |
| Filed: | Jun. 10, 1991 |

Certificate of Correction issued Nov. 16, 1993.

[51] Int. Cl.⁶ .................................................. A47J 27/04
[52] U.S. Cl. .................. 99/341; 99/415; 99/417; 99/446; 99/450; 126/369; 126/401
[58] Field of Search .................... 99/341, 415, 417, 99/446, 450; 126/369; 219/401

[56] References Cited

U.S. PATENT DOCUMENTS

| | | |
|---|---|---|
| 57,244 | 8/1866 | Bacon. |
| 64,142 | 4/1867 | Potwin. |
| 197,113 | 11/1877 | Flanders. |
| 771,574 | 10/1904 | Renn. |
| 776,926 | 12/1904 | Misener. |
| 1,103,169 | 7/1914 | Beam. |
| 1,175,442 | 3/1916 | Hanks. |
| 1,802,005 | 4/1931 | Detwiler. |
| 2,622,591 | 12/1952 | Bramberry. |
| 2,715,898 | 8/1955 | Michaelis et al.. |
| 3,577,908 | 5/1971 | Burg. |
| 3,949,733 | 4/1976 | Miller et al.. |
| 4,159,675 | 7/1979 | Schwarz et al.. |
| 4,509,412 | 4/1985 | Whittenburg et al.. |
| 4,648,382 | 3/1987 | Greenbacker. |
| 4,650,968 | 3/1987 | Williams. |

FOREIGN PATENT DOCUMENTS

| | | |
|---|---|---|
| 271879 | 3/1914 | Germany. |
| 75371 | 2/1919 | Germany. |
| 7612 | of 1913 | United Kingdom. |

*Primary Examiner*—Timothy F. Simone

[57] ABSTRACT

A steam cooking utensil includes a base, a boiling liquid reservoir defined by the base, and a heater mounted in the base to heat liquid in the boiling liquid reservoir. A drip ring is supported in the base above the liquid reservoir. A cooking bowl is supported by the base and includes a bottom tray having an imperforate surface and a food support surface extending radially outwardly from the imperforate surface. The food support surface is defined by a plurality of alternating hill-like ridges and valley-like channels extending radially outwardly in concentrically spaced rings. The food support surface includes a plurality of vent holes for enabling steam generating in the reservoir to flow into the cooking bowl.

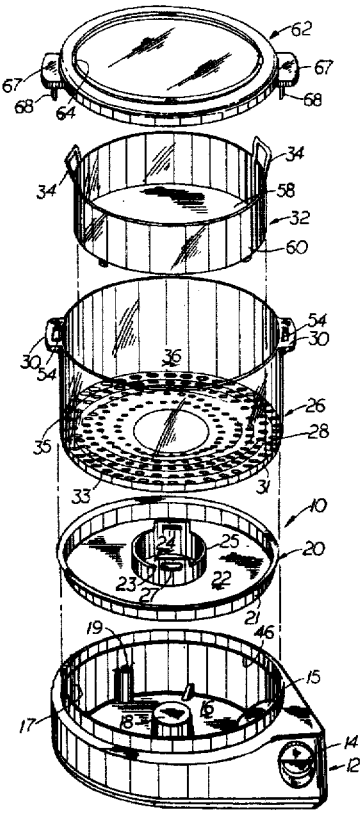

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-8 is confirmed.

* * * * *